UNITED STATES PATENT OFFICE.

ROBERT WILHELM STREHLENERT, OF GOTTENBORG, SWEDEN, ASSIGNOR TO AND. H. KIAER & CO., LTD., OF NORWAY, OF GLEMMINGE, NORWAY.

PROCESS OF TREATING WASTE LIQUOR FROM SULFITE-CELLULOSE FACTORIES.

1,384,219.

Specification of Letters Patent.

Patented July 12, 1921.

No Drawing. Application filed February 7, 1918. Serial No. 215,907.

*To all whom it may concern:*

Be it known that I, ROBERT WILHELM STREHLENERT, a subject of the King of Sweden, residing at Gottenborg, in the Kingdom of Sweden, have invented certain new and useful Improvements in the Processes of Treating Waste Liquor from Sulfite-Cellulose Factories, for which I have filed applications in Sweden Jan. 31, 1917, and Norway Feb. 3, 1917, of which the following is a specification.

This invention has for its object an improved process of treating waste liquor from sulfite cellulose factories for the purpose of recovering the organic and inorganic constituents of such liquors.

In United States Letters Patent No. 1,149,420, I have described a process of treating waste liquors from sulfite cellulose factories according to which the dissolved organic and inorganic constituents of the liquor are decomposed by heating under a high pressure in the presence of sulfuric acid formed during the process itself. A further investigation has demonstrated that the organic substances in the sulfite liquors are present both as ligno-sulfites and ligno-sulfates. The ligno-sulfites are easily decomposed according to the process employed in the said patent, while the ligno-sulfates remain substantially unaffected.

The present invention affords means of decomposing the ligno-sulfates as well as the ligno-sulfites, and consists in combining with the decomposition step of the said patent, preliminary concentration of the liquor by evaporation. I have found that the surplus heat liberated during the decomposition of the ligno-sulfites and ligno-sulfates may be utilized in the concentration step, and where multiple unit vacuum evaporators are employed, the product may be obtained without substantially increasing the operation costs.

In carrying out the process, the concentration is preferably continued until about 20% of the liquor has been evaporated, and the concentrated solution is then subjected to further treatment according to the aforesaid patent.

It has been found that the total organic product obtained in accordance with this process, is increased over the product obtained by the said patent by a percentage equal to or even greater than the percentage by which the initial solution was evaporated. This result is attributed to the decomposition of ligno-sulfates which if no evaporation had taken place, would remain unaltered, and can be explained in the following manner: When the evaporation *in vacuo* is carried out, a portion of the calcium salts present is precipitated and sulfur dioxid escapes. The organic compounds which were combined with the said calcium salts will then become comparatively unstable and will easily precipitate during the subsequent treatment of the liquor. Thus practically all of the organic and inorganic constituents contained in the liquid may be recovered in the form of useful substances.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of treating sulfite liquors to recover organic and inorganic constituents therefrom, which comprises concentrating the said liquors and subjecting the concentrated solution to decomposition by heating under pressure.

2. The process of treating sulfite liquors to recover organic and inorganic constituents therefrom, which comprises concentrating the said liquors and subjecting the concentrated solution to decomposition by heating in the presence of sulfuric acid to a high temperature under pressure.

3. The process of treating sulfite liquors to recover organic and inorganic constituents therefrom, which comprises concentrating the said liquors to about 80% of their original volume, and subjecting the concentrated solution to decomposition by heating under pressure.

4. The process of treating sulfite liquors to recover organic and inorganic constituents therefrom, which comprises decomposing the calcium compounds thereof by concentrating the said liquors to about 80% of their original volume, and subjecting the concentrated solution under pressure to a high temperature, whereby the calcium ligno-sulfites and calcium ligno-sulfates are decomposed.

5. The process of treating sulfite liquors to recover organic and inorganic constituents therefrom, which comprises decomposing the calcium compounds thereof by concentrating the said liquors to about 80% of their original volume, and subjecting the concentrated solution to the combined action of heat and pressure, whereby the free and combined sulfurous acid contents of the concentrated solution are transformed into sulfuric acid and precipitation is effected by simultaneously reacting on the combined organic and inorganic constituents of the liquor with said sulfuric acid during its formation.

6. The process of treating sulfite liquors to recover organic and inorganic constituents therefrom, which comprises concentrating the said liquors and subjecting the concentrated solution to decomposition by heating under pressure, the heat liberated on decomposition being utilized in the concentration step.

7. The process of treating sulfite liquors to recover organic and inorganic constituents therefrom, which comprises concentrating the said liquors to about 80% of their original volume, and subjecting the concentrated solution to decomposition by heating under pressure, the heat liberated on decomposition being utilized in the concentration step.

8. The process for the decomposition of waste liquor from sulfite cellulose factories by means of heating under high pressure and conversion of free or combined sulfurous acid into sulfuric acid, comprising the step of subjecting the liquor to concentration by means of evaporation previously to the said decomposition operation, the said evaporation being carried out *in vacuo*.

In testimony that I claim the foregoing as my invention, I have signed my name in presence of two subscribing witnesses.

ROBERT WILHELM STREHLENERT.

Witnesses:
 OSKAR ETZ,
 A. GOUVEREDGE.